March 3, 1970   J. D. HOSKINSON ET AL   3,499,065
METHOD OF MAKING LAMINATED ARTICLES
Filed Oct. 2, 1967

INVENTOR.
JOHN D. HOSKINSON
BY EUCLID L. HITCHCOCK
J.D. Wolfe
ATTORNEY

United States Patent Office 3,499,065
Patented Mar. 3, 1970

3,499,065
METHOD OF MAKING LAMINATED ARTICLES
John D. Hoskinson, Lancaster, and Euclid L. Hitchcock, Logan, Ohio, assignors to The Goodyear Tire & Rubber Company, Akron, Ohio, a corporation of Ohio
Filed Oct. 2, 1967, Ser. N. 672,205
Int. Cl. B29d 9/00
U.S. Cl. 264—45                                   1 Claim

---

ABSTRACT OF THE DISCLOSURE

This invention relates to a method of making laminated articles by securing a bond between a thermoplastic sheet and a pore forming resin which has expanded to form a foam by placing a powdered resin in contact with the thermoplastic sheet while the sheet is at a temperature sufficient to adhere the dry powder applied thereon and then pouring an uncured pore forming resin into contact with the thermoplastic sheet effecting foaming of the pore forming resin to obtain a laminate, the preferred thermoplastic resin being a vinyl plastic and the preferred port forming resin being a polyurethane.

---

This invention relates to laminated articles and more particularly to laminated articles composed of a plurality of layers of synthetic resin or the like.

In the manufacture of cushions, automobile crash pads and the like, a suitably resilient or impact absorbing mass of material may be formed from, for example, a foamable mixture of polyisocyanate and a polyester, and molded to a desired shape. Desirably a decorative and protective layer of material such as a vinyl resin is attached to the mass on one or more sides thereof as an outer layer.

One method of forming an article of the type described involves coating portions of a mold cavity with a vinyl plastisol which corresponds to the portion of the foamed mass which it is desired to cover with a vinyl layer, heating the mold to cause the vinyl resin to fuse into a self-sustaining layer and thereafter pouring the foamable mixture into the mold cavity over the vinyl layer. The basic shortcoming of an article made in this manner is that the foamed material does not adhere adequately to the vinyl layer.

It is accordingly an object of this invention to provide a method for effectively securing together a layer of fused vinyl polymer to a mass of urethane foam.

A further object of this invention is to provide a resilient or impact absorbing article which includes a mass of foamed impact absorbing resin material having a relatively thin flexible synthetic resin outer layer over at least a portion thereof and which further has a layer of unstabilized vinyl resin between the urethane and the fused vinyl outer layer so that portions of the unstabilized resin are embedded within the outer layer and the foamed mass whereby the outer layer and foamed mass are effectively secured together and the outer layer is relatively soft and resilient to the touch and presents an attractive appearance.

Another object of the invention is to provide a resilient or impact absorbing article which comprises a foamed isocyanatemodified ether or polyester or a hydrocarbon polyol mass having an outer vinyl layer covering portion and which includes an unstabilized powdered resin layer interposed between the vinyl and polyether or polyesterurethane layers, the unstabilized powdered resin layer being partially embedded in the vinyl layer and the polyether or polyesterurethane layer being foamed and molded against the unstabilized powdered resin layer.

Further objects and advantages of the present invention will be apparent from the following description, reference being had to the accompanying drawings wherein a preferred embodiment of the present invention is clearly shown.

Figure 1:
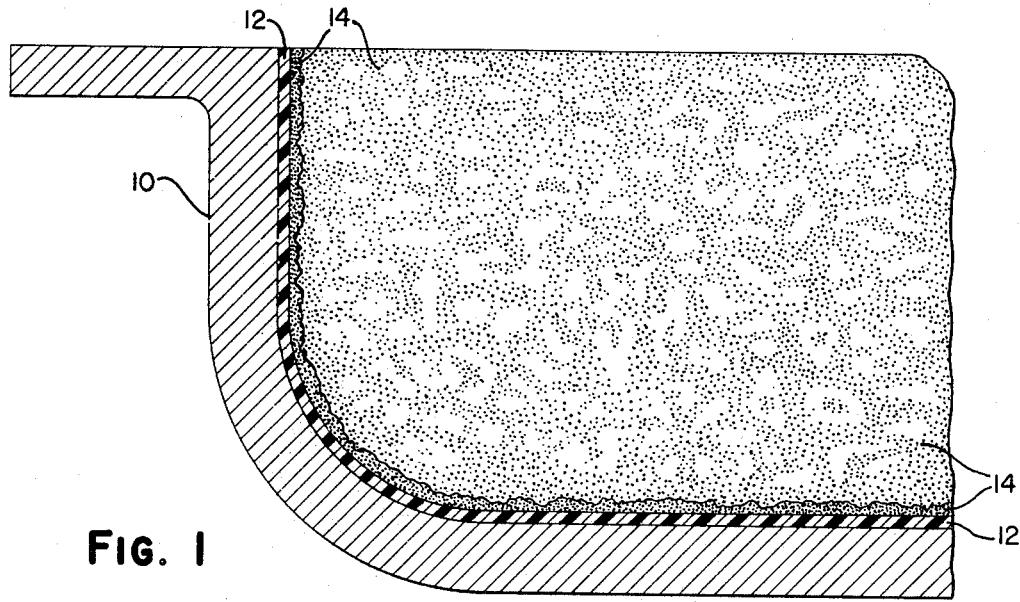
Figure 2:
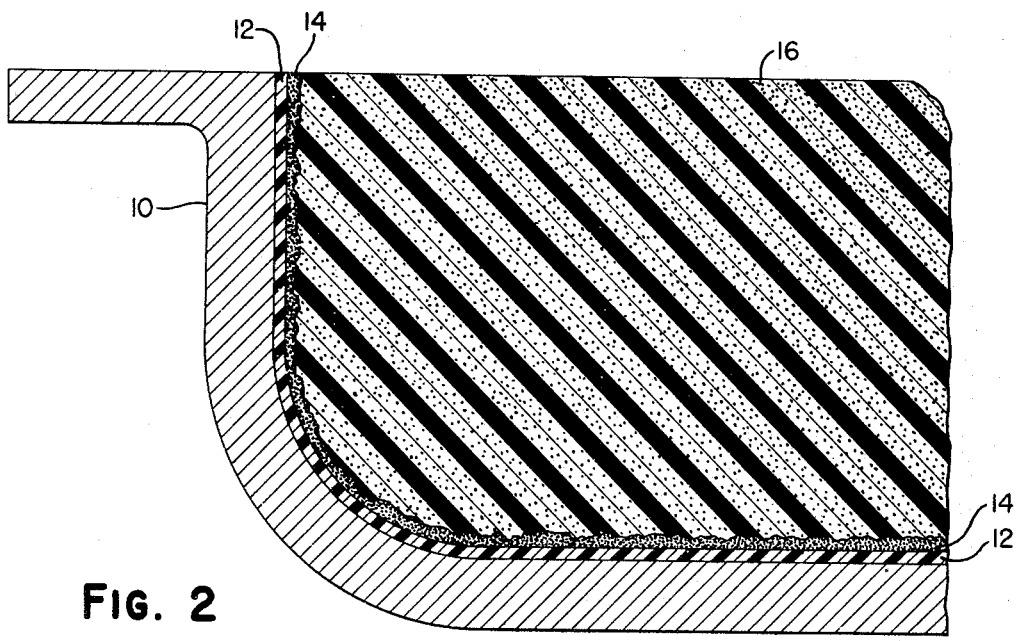

In the drawings:
FIGURE 1 shows an unstabilized powdered resin layer spread over the fused vinyl plastisol or dry vinyl powder coating.
FIGURE 2 shows an isocyanate-modified resin foamed and molded over the unfused powdered resin layer of FIGURE 1.

To illustrate the present invention a resilient or impact absorbing article such as a crash pad for use in automobiles and the like is preferably made of a foamed isocyanate-modified polyether mass molded in suitable dimensions to which is secured a suitable vinyl resin outer layer to provide the article with an attractive appearance when installed and a surface which is resistant to moisture, dirt and the like and further which has a high degree of flexibility and is pleasing to the touch.

In carrying out the invention a mold is provided as shown is FIGURE 1 which is designated by numeral 10 and which may have a cavity of any suitable shape or contour in accordance with the desired shape of the crash pad or article to be molded. The surface of the mold cavity is first coated with a layer 12 of suitable thickness such as a vinyl plastisol or a dry vinyl powder containing plasticizer. By the term vinyl plasticol is meant a vinyl resin such as a vinyl chloride polymer which has been mixed with a suitable plasticizer such as di-2-ethyl hexylphthalate to form a slurry or dispersion, and which when heated to a fusion point forms a solution and then sets to form a film when cooled.

A suitable vinyl plastisol is illustrated by the following example:

|  | Parts |
|---|---|
| Polyvinyl chloride (dispersion grade) | 100 |
| Di-2-ethylhexylphthalate (plasticizer) | 90 |
| Barium and cadmium salt complex (heat and light stabilizer) | 3 |
| Calcium carbonate (filler) | 10 |
| Mineral oil (internal lubricant) | 2 |

Other vinyl polymers may be used to form plastisols or powder sols, as for example, polyvinyl acetate, polyvinyl alcohol and chloro-sulfonated polyethylene and various vinyl copolymers such as a copolymer of vinyl chloride and vinylidene chloride, as are well known in the art. Various plasticizers such as oxidized soybean oil and diethylene glycol may be used and various other ingredients may be added to form films having desirable characteristics as is well known in the art.

Also, other thermoplastic molding powders such as the terpolymer of acrylonitrile, butadiene and styrene may be used to form the skin.

After coating the mold surface with a plastisol or dry powdered layer and fusing to form the layer into a skin, a layer 14 of powdered resin is applied over the fused skin while the layer 12 is still sufficiently warm to adhere the powdered resin thereto with or without fusing the applied powder, although preferably it fuses and heat degrades to provide reactive sites for urethane bonds. Then this skin 12 containing a layer 14 of adhered powdered resin is ready to be removed from the mold when sufficiently cooled and have the foaming material applied thereto.

A suitable semi-rigid isocyanate-modified polyether suitable for the embodiment described above may be formed and molded by mixing the foaming ingredients, at least an organic polyisocyanate, a reactive hydrogen material of 500 to 6000 molecular weight and a blowing agent at about 77 to 95° F. or higher and allowing the heat of reaction to carry the reaction, or they may be cooked for about 10 to 90 minutes at an elevated temperature, usually about 150 to 250° F.

The polyurethane suitable for use in forming the foam may be one of the type shown in Example 1 or it may be the reaction product of an organic polyisocyanate and a polyester or polyhydrocarbon polyol with or without the use of an auxiliary blowing agent such as the low boiling materials, for instance, fluorinated hydrocarbons and/or water. A specific illustrative example of this invention is exemplified in Example 1.

EXAMPLE 1

An aluminum mold such as that shown in FIGURE 1 having the desired surface and aesthetic characteristics embossed therein was heated to a temperature of about 500° F. and a dry polyvinyl chloride plasticized powder was added and the mold was rotated to cover the surface of the mold with a dry polyvinyl chloride powder. Then the excess powder was dumped from the mold and the mold was again heated to a temperature of about 450° F. to thoroughly fuse the powder into an integral skin or film having the desired aesthetic characteristics embossed on its outer surface. Then this mold with the fused film still thereon was removed from the oven and while still hot a thin film of a suitable tying powder was applied to the fused surface of the skin. This suitable tying surface material is preferably a polyvinyl chloride which has groups therein that are reactive with isocyanate. For instance, hydroxyl groups or amine groups, but where the polyvinyl chloride is essentially free of these groups some effective groups appear to be formed when the resin is applied to the hot surface.

A polyether urethane foamable reaction mixture is then prepared by mixing about .94 equivalent of a polypropylene ether triol, 6.85 equivalents of tolylene diisocyanates, then 180 parts of this mixture is mixed with 3.7 parts of N,N,N',N'-tetrakis (2-hydroxy propyl) ethylene diamine, 15.5 parts of glycerol with varying amounts of amine type catalysts such as triethylene diamine and/or N-ethyl morpholine and from 1 to 2 parts of an auxiliary blowing agent, $CFCl_3$. This foamable reaction mixture was then added to the interior of the skin and allowed to foam to fill the molded skin of the article as shown in FIG. 2. When the foamable reaction mixture has filled the mold as shown in FIG. 2 and has set and cured it may be then stripped from the mold to give the desired article such as a crash pad.

The thickness of the powdered unstabilized resin layer may be varied so as to produce a desired final effect on the adhesion of the polyurethane to the outer vinyl layer. However, it is essential that the powdered unstabilized resin layer be sufficiently thin so as to have no degrading effect on the outer vinyl skin, i.e., about 1 to 5 microns or more.

Although the present invention has been described essentially in terms of a specific embodiment it is apparent that the invention may be utilized in connection with various materials. Thus the layer 12 may be any material which may be applied to a mold surface in a liquid or highly plastic state in which portions of the sprayed powdered unstabilized resin layer will become embedded and which will thereafter set to form a self-sustaining layer. The layer 16 may be formed of any suitable foamable material including the various elastomeric synthetic resins such as butadiene acrylonitrile copolymers and butadiene-styrene copolymers and natural rubber. In manufacturing various articles of a nonfoamed nature appropriate moldable resins may be used in combination with powdered unstabilized resin layers as above described.

While certain representative embodiments and details have been shown for the purpose of illustrating the invention, it will be apparent to those skilled in this art that various changes and modifications may be made therein without departing from the spirit or scope of the invention.

What is claimed is:

1. In a method of securely bonding a thermoset plastic sheet to a plastic resin foam without the use of any additional adhesive, comprising the steps of applying an uncured plasticized thermoset resin selected from group consisting of; polyvinyl acetate, polyvinyl alcohol, chlorosulfonated polyethylene, a vinyl chloride-vinylidene chloride copolymer, and an acrylonitrile, butadiene and styrene interpolymer to the bare face of a mold to form a single sheet free from any additional adhesive when the thermoset plastic has been fused, then applying directly onto the entire surface of said adhesive free uncured sheet a powdered resin of the same group as the thermoset plastic sheet, while said sheet is hot but at a temperature sufficient to adhere the dry powdered resin applied thereon and then pouring an uncured pore forming resin from the group consisting of; polyurethane, natural rubber, and butadiene-acrylonitrile, butadiene-styrene copolymers, into said mold immediately adjacent said cured sheet to embed the extended portion of said powder therein, curing and expanding said pore forming resin and removing the bonded article from the mold.

References Cited

UNITED STATES PATENTS

| 2,950,505 | 8/1960 | Frank | 264—45 |
| 2,983,963 | 4/1961 | Jodell et al. | 264—46 |
| 3,042,137 | 8/1962 | Mathues et al. | 297—452 |
| 3,108,852 | 10/1963 | Olsen | 264—46 |
| 3,248,738 | 4/1966 | Morgan | 297—452 |
| 3,286,004 | 11/1966 | Hill et al. | 264—45 |

JULIUS FROME, Primary Examiner

LEON GARRETT, Assistant Examiner

U.S. Cl. X.R.

264—54; 297—452